United States Patent [19]

Van Der Ziel et al.

[11] 3,783,402

[45] Jan. 1, 1974

[54] JOSEPHSON JUNCTION AMPLIFIER

[75] Inventors: Aldert Van Der Ziel, Minneapolis; Hyun Mook Choe, St. Paul, both of Minn.

[73] Assignee: The United States of America as represented by the Secretary of the Navy, Washington, D.C.

[22] Filed: June 28, 1972

[21] Appl. No.: 266,910

[52] U.S. Cl. ............... 330/61 R, 330/24, 330/61 A, 307/306

[51] Int. Cl. ............ H03f 15/00

[58] Field of Search .................. 330/61 R, 61 A, 62; 307/377, 306, 212; 329/117; 332/52, 52 T

[56] References Cited

UNITED STATES PATENTS

| | | | |
|---|---|---|---|
| 3,707,670 | 12/1972 | Erdman | 307/277 X |
| 3,162,775 | 12/1964 | McFarrah | 307/277 X |
| 3,423,607 | 1/1969 | Kunzler et al. | 307/306 |
| 3,281,609 | 10/1966 | Rowell | 307/277 X |

*Primary Examiner*—Nathan Kaufman
*Attorney*—R. S. Sciascia

[57] ABSTRACT

The invention disclosed herein utilizes the Josephson tunneling effect to provide an amplifier having unique characteristics.

The Josephson tunneling effect relates to a supercurrent flow thru a thin barrier between two superconductors by quantum mechanical tunneling of electron pairs; in other words, current can flow with no voltage applied between the superconductors. The dc quantum interference effect can produce thru the use of an external magnetic field a large change in barrier current by tunneling and is used herein to produce an amplifier.

10 Claims, 13 Drawing Figures

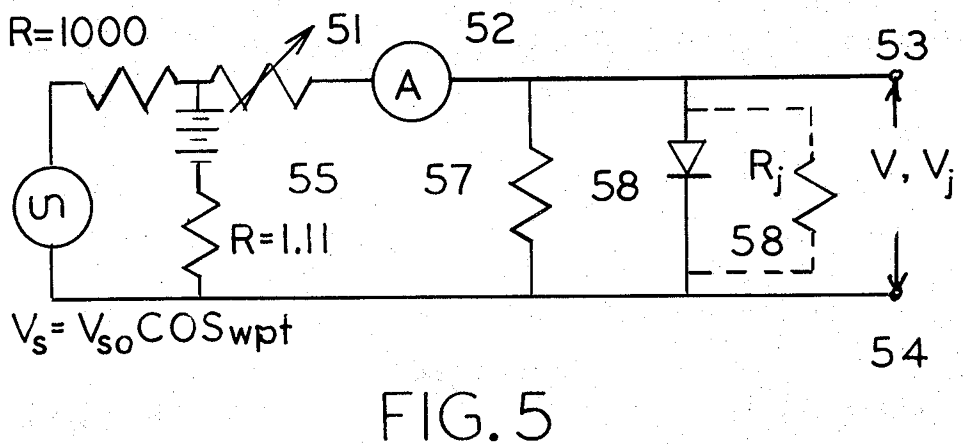
FIG. 5
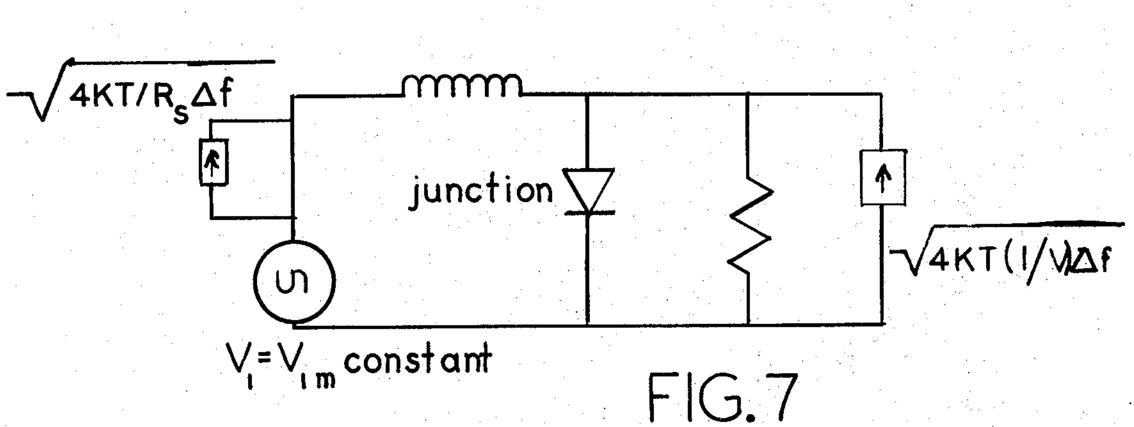
FIG. 7
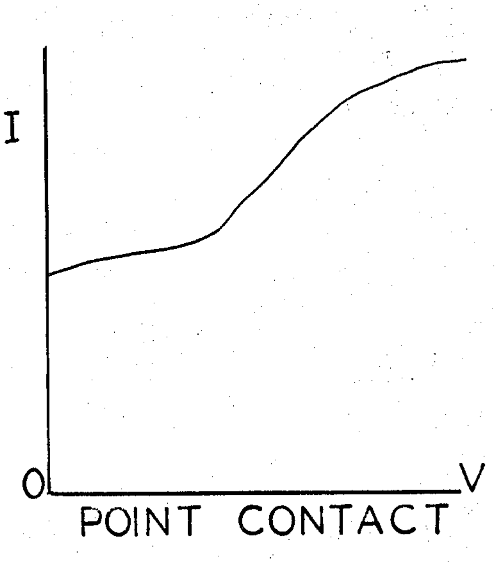
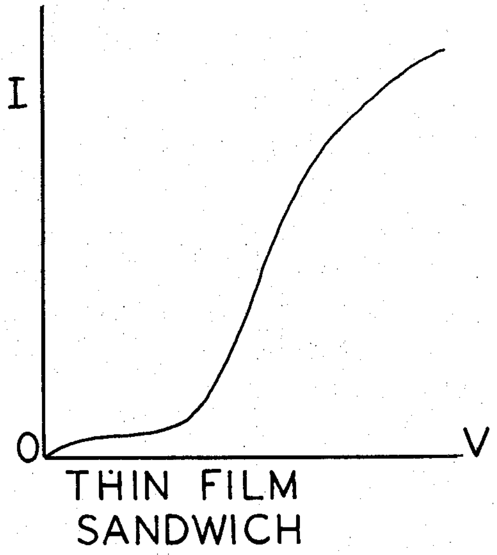
FIG. 8 FIG. 9

NOTE
L1, L2, L3, L4 are wound on 1/2 wdtt resistances
L1-32 TURNS
L2-35 "
L3-36 "
L4-34 "

JOSEPHSON JUNCTION AMPLIFIER

The alternating current Josephson effect implies that if a pair of weakly coupled superconductors with a thin barrier (Josephson junction) are maintained at a potential difference $V$, an alternating supercurrent with frequency $$f = (2e/h)\ V$$

flows between the superconductors, where h is Plank's constant and $e$ is the electron charge.

The excellent noise characteristics of the junction make it possible to build a low frequency amplifier that can handle very weak signals without adding much noise.

It is therefore an object of this invention to provide a low frequency amplifier.

It is a further object of this invention to provide a Josephson junction type amplifier having an improved low frequency signal to noise ratio wherein the amplifier provides small component of added noise.

An additional object of this invention is to provide an improved cryogenic amplifier comprising:

A cryogenic system consisting of a circuit including a Josephson junction and input and output terminals, a bias current supply coupled to the input terminals, a source of low frequency signals coupled to the input terminals, a pre-amplifier circuit coupled to the output terminals, a main amplifier coupled to the pre-amplifier, a limiter and frequency modulating discriminator coupled to the main amplifier, an attenuator coupled to the limiter and frequency modulating discriminator, a low frequency amplifier coupled to the attenuator, a passband filter coupled to the low frequency amplifier, and, means including an indicating device to show the presence or absence of a signal.

Still a further object of this invention is to provide an improved cryogenic generating system incorporating a point contact Josephson junction.

Yet a further object of this invention is to provide an improved cryogenic system wherein a thin film bridge Josephson junction is used.

And yet a further object of this invention is to provide an improved amplifier utilizing a cross wire type Josephson junction.

And still a further object of this invention is to provide a soder blob type Josephson junction.

Other objects, advantages and novel features of the invention will become apparent from the following detailed description of the invention when considered in conjunction with the accompanying drawings wherein.

Figure 4:
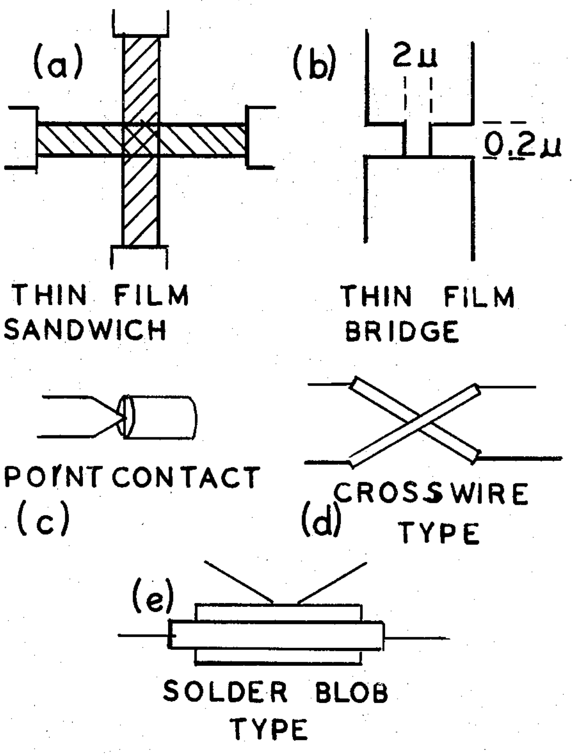

FIG. 4*a*, shows a thin film sandwich junction; FIG. 4*b* shows a thin film bridge junction; FIG. 4*c*, shows a point contact junction as described previously; FIG. 4*d*, shows a cross wire type junction; FIG. 4*e*, shows a soder blob type (Clark slug type) junction;

FIG. 5, shows the bias current supply circuit.

Figure 6:
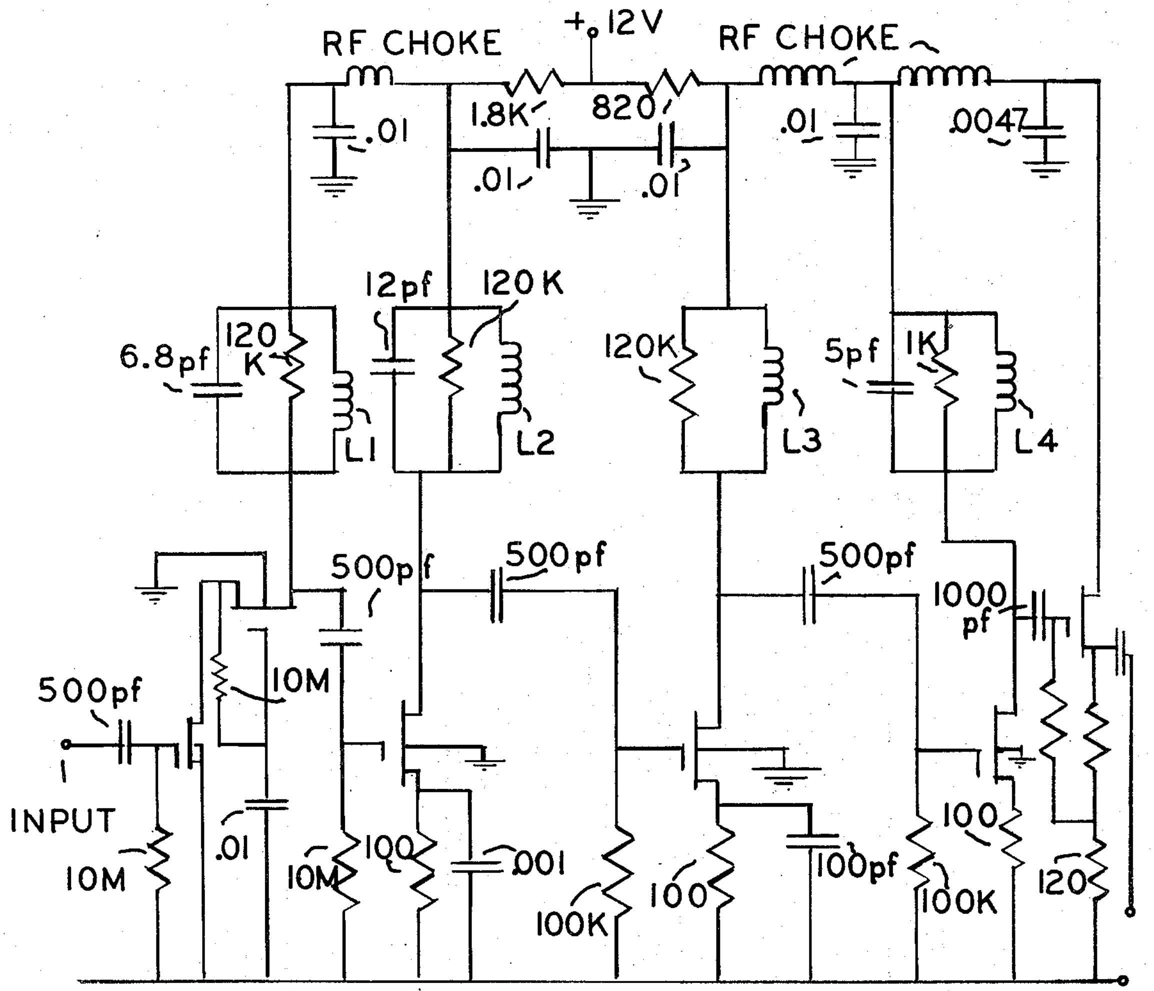

FIG. 6, shows a preamplifier circuit usable with this invention.

FIG. 7, shows the equivalent circuit of cryogenic amplifier.

FIG. 8 shows the voltage current graft for a point contact junction.

FIG. 9, shows a current voltage graft for a thin film sandwich junction.

Figure 1:
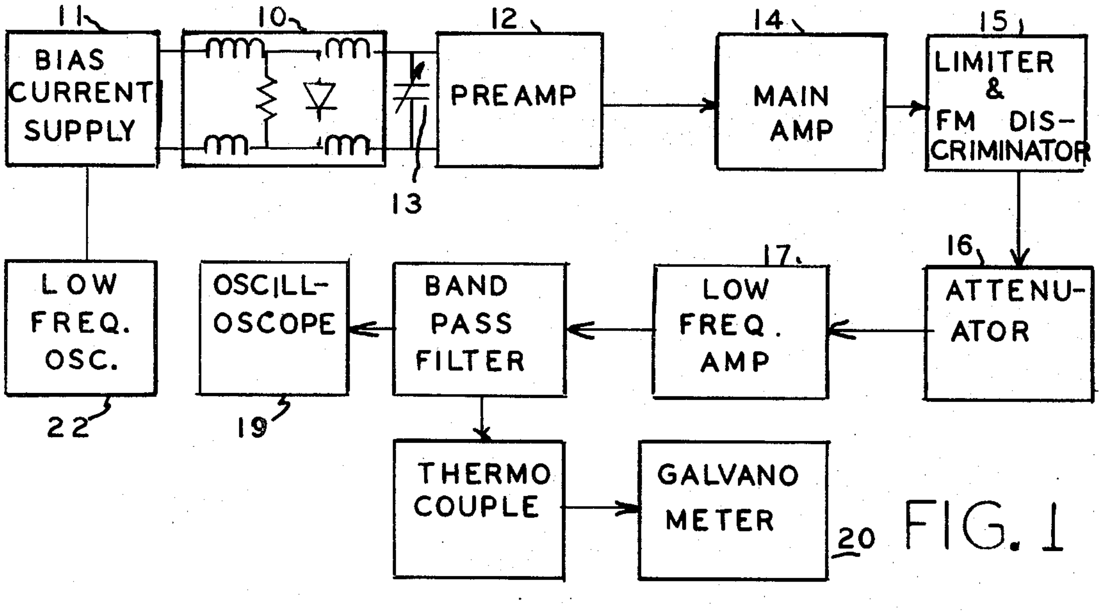
FIG. 1, is a block diagram incorporating the invention.

FIG. 1, a block diagram shows the general configuration of one device incorporating the invention. The cryogenic junction system 10, is a bias current supply 11, coupled to provide a constant bias supply. A preamplifier circuit 12, is shown connected to output terminals of cryogenic junction 10, and a variable capacitor 13, is connected across the output terminals.

Figure 2:
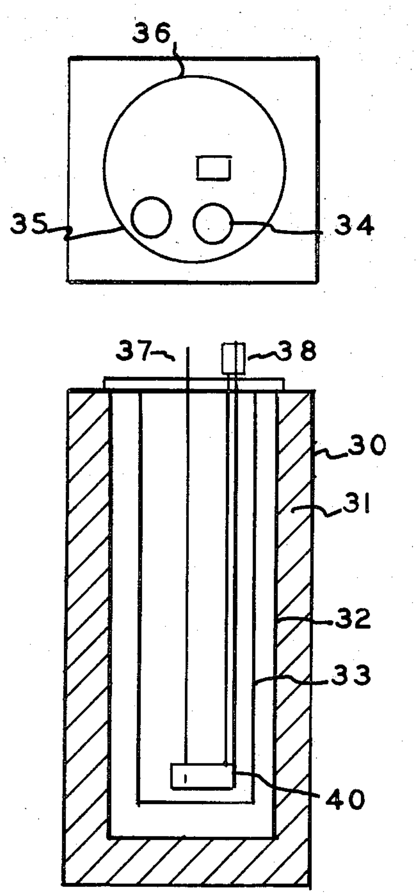
FIG. 2, shows the cross section in detail of the structure of the cryogenic system.

The signal from preamplifier 12, is fed to a main amplifier 14 and in turn coupled successively thru a limiter and frequency modulating discriminator 15, attenuator 16, low frequency amplifier 17, and bandpass filter 18. The output of the bandpass filter is read by an oscilloscope 19, and a galvanometer 20, thru a thermocouple device 21, The bias current supply 11 is fed by a flow frequency oscillator 22. The mechanical details of the Josephson junction is shown in FIG. 2, and consists of an aluminum box 30, with insulating foam 31, an outer dewar 32, and an inner dewar 33. A liquid helium inlet 34, is provided as is a liquid nitrogen inlet 35. A cap 36, provides sealing and at the same time allows for coupling an adjusting screw handle 37, and a lead wire box 38.

Figure 3:
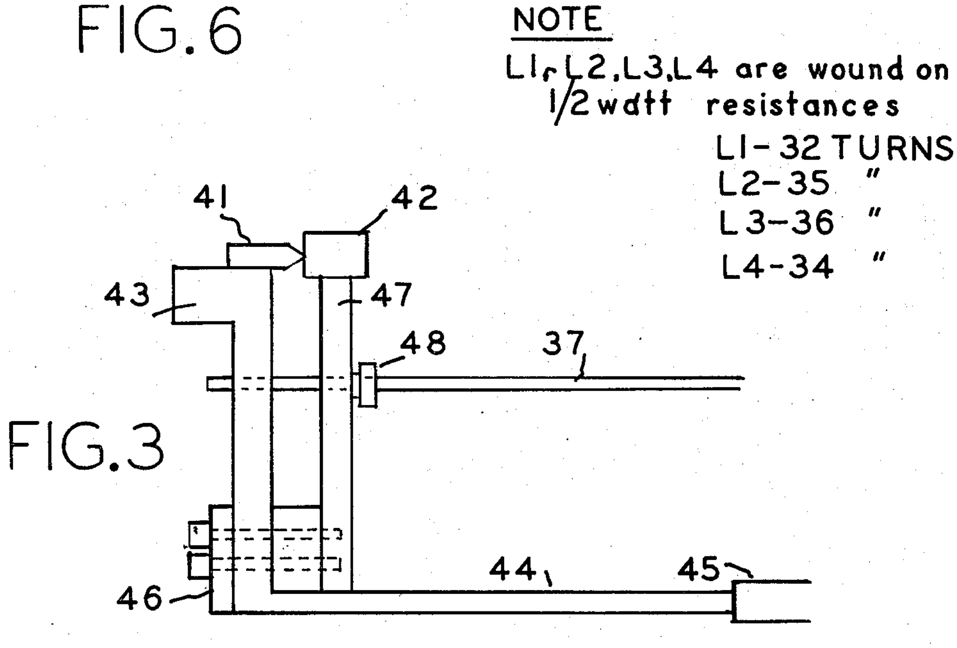
FIG. 3, is a detailed structure of the mount for the Josephson junction.

Within the inner dewar 33, is shown the junction point mount 40, shown in detail in FIG. 3. The point contact Josephson junction 41, is shown in contact with the niobium surface 42. Contact 41, is mounted on a connecting support member 43, which is a brass support having an elongated portion 44, mounted thru a copper tube 45. Surface 42 is mounted on support member 47. Plexiglass insulation is provided for 46 and 47, to electrically insulate the members. The adjusting rod 37, is mounted thru member 47, and attached to member 43. Member 47, is insulated from the screw rod 37 by plexiglass washer 48.

FIG. 5, is a bias current supply circuit usable with the invention having a battery 50, providing current thru a variable resistor 51, and an ammeter 52, to an output terminal 53. The negative terminal 54, of battery 50 is connected thru a resistor 55 to a second output terminal 56. Cross terminals 53 and 56 is a resistor 57, and the cryogenic system input designated schematic is 58. The resistors 51, 57, and 55, provide a resistance network to divide the voltage of battery 50 in this case 12 volts across the input to the cryogenic system.

It is very necessary to make a bias current supply very stable and low noise. Electronic power supplies are usually not satisfactory. The ordinary dry cell battery or mercury battery is much better for the purpose. By a variable series resistance the bias current could be controlled from 1 UA to 1A. Two r. f. choke coils and a capacitor were used to block the high frequency signal from the power supply (FIG. 5). Through the external resistance a low frequency voltage could also be superimposed on the dc voltage.

FIG. 6, is a detailed schematic circuit design showing the preamplifier circuit 12 in FIG. 1.

A number of junctions were made and used to study the properties of the junction characteristics. By improving the techniques good functions are obtained.

30 mil niobium wire was used for the sharp point and a niobium rod of one-eighth inch diameter was used for the flat surface part of the junction. The material was supplied by Material Research Corporation. Following are the properties of the material (niobium).

| | | | |
|---|---|---|---|
| Atomic number | 41 | density (20° C) | 8.57 gr/cm³ |
| Atomic weight | 92.91 | purity | 99.98 |
| Crystal structure | BCC | Critical temp. | 9.17° K |
| Melting point | 2468°C | Critical field | 1944 Oe |
| Boiling point | 3300°C | | |

A very sharp point was made by partly immersing the niobium wire in a etching solution consisting of equal parts of hydrofluoric acid and nitric acid. The etching speed can be controlled by the ratio of hydrofluoric acid to nitric acid. The etching solution attacks the immersed part of the material, leaving a regular cone with about a 20 degree angle and a very fine point of about 20 micron.

As the point 41 was found to be flattened to about 80 micron in diameter after it was used, the point should be sharpened again and remounted every time before measurement. The flat part of the junction 42 was found first on a fine metal file and then a final polishing of the surface was done on a glass plate with fine 1000 grit aluminum oxide and some water the surface turned out to be very fine and flat by microscopic examination.

As a very small potential difference (0.062 uV) should be applied between these two superconductors to get a 30 MHz radio frequency radiation, a small shunt resistor was provided. Two pieces of brass 43, 47 were tightened to each other by four screws (FIG. 3) they were soldered to the support copper rod which consists of two coaxial tubes, 44, 45. The outside one was copper and the inside one was nickel and the lead wire went through each of those tubes. The bias resistance was made by a narrow brass or copper strip according to the required resistance value and it was soldered to the brass block above. The resistance value was changed from $10^{-6}$ to $10^{-1}$ and sometimes no bias resistance was used at all.

The pressure of the point contact can be controlled from outside of the cryogenic system by squeezing the very fine 0–80 screw (see FIG. 2). The junction had a superconducting turning coil at both sides of the lead wire and was tune to get a maximum output power.

At first indium soldering was tried to connect the super-conducting junction to the brass resistor, but that could not sufficiently stand the pressure. Therefore, a thin plate was cut from the niobium rod and the junction was completed by spot welding the nobium plate to the copper plate. Thereafter the copper plate was soldered with ordinary solder to the brass resistor.

Obviously many modifications and variations of the present invention are possible in the light of the above teachings. It is therefore to be understood that within the scope of the appended claims the invention may be practiced otherwise than as specifically described.

I claim:

1. An improved cryogenic amplifier comprising:

a. a cryogenic system having a Josephson junction and input and output terminals;

b. a bias current supply coupled to said input terminals;

c. a source of low frequency signals coupled to said input terminals;

d. a pre-amplifier circuit coupled to said output terminals;

e. a main amplifier coupled to said pre-amplifier;

f. a limiter and frequency modulating discriminator coupled to said main amplifier;

g. An attenuator coupled to said limiter and frequency modulating discriminator;

h. a low frequency amplifier coupled to said attenuator;

i. a bandpass filter coupled to said low frequency amplifier; and, j. means, including an indicating device to show the presence or absence of a signal.

2. The improved amplifier of claim 1 wherein said Josephson junction is a point contact junction.

3. The improved amplifier of claim 1 is a thin film sandwich junction.

4. The improved amplifier of claim 1 wherein said Josephson junction is a thin film bridge junction.

5. The improved amplifier of claim 1 wherein said Josephson junction is a cross wire type junction.

6. The improved amplifier of claim 1 wherein said Josephson junction is a soder blob type junction.

7. The improved amplifier of claim 1 wherein said bias current supply of claim 1 which includes a battery in series with a resistance bridge coupled across said input terminals.

8. The improved amplifier of claim 7 wherein said source of low frequency signals is coupled across a portion of said resistance of said bias current supply.

9. The improved amplifier of claim 1 wherein said Josephson junction has a cryogenic system which includes a first mounting arm and a second mounting arm, said Josephson junction being mounted on said first and second arms, said arms adjustably mounted for varying the pressure across the Josephson junction.

10. The device of claim 9 wherein the electrical contacts to said mounting arms is a coaxial member, said mounting system adapted to be maintained at a temperature sufficient to have supercurrent generated by superconductivity.

* * * * *